United States Patent
Engel et al.

(10) Patent No.: US 8,310,099 B2
(45) Date of Patent: Nov. 13, 2012

(54) ENERGY SUPPLY IN WHICH A PLURALITY OF COMPONENTS DISPOSED ALONG A TRANSMISSION ROUTE EACH TRANSFORM A VOLTAGE

(75) Inventors: Markus Engel, Nürnberg (DE); Robert Frankenberg, Erlangen (DE); Harald Karl, Fürth (DE); Wolfgang Spaeth, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 11 days.

(21) Appl. No.: 12/680,270

(22) PCT Filed: Sep. 24, 2008

(86) PCT No.: PCT/EP2008/062741
§ 371 (c)(1),
(2), (4) Date: Apr. 8, 2010

(87) PCT Pub. No.: WO2009/043768
PCT Pub. Date: Apr. 9, 2009

(65) Prior Publication Data
US 2010/0213765 A1 Aug. 26, 2010

(30) Foreign Application Priority Data
Sep. 26, 2007 (DE) .................. 10 2007 047 165

(51) Int. Cl.
*H02J 1/00* (2006.01)
*H02J 3/00* (2006.01)
(52) U.S. Cl. ............................................. 307/69; 307/12
(58) Field of Classification Search ......... 307/1, DIG. 1, 307/69, 12
See application file for complete search history.

(56) References Cited

U.S. PATENT DOCUMENTS

| | | | |
|---|---|---|---|
| 3,949,291 A * | 4/1976 | Kanngiesser et al. | ........ 323/205 |
| 6,339,263 B1 | 1/2002 | Lejonberg | |
| 6,782,833 B2 | 8/2004 | Nightall | |
| 2002/0134278 A1* | 9/2002 | Nightall | ........ 104/298 |
| 2005/0002211 A1* | 1/2005 | Lee et al. | ........ 363/44 |

FOREIGN PATENT DOCUMENTS

| | | |
|---|---|---|
| DE | 4037531 A1 | 2/1992 |
| JP | 62227828 A | 10/1987 |
| JP | 4029525 A | 1/1992 |
| WO | 9855339 A1 | 12/1998 |
| WO | 0179018 A1 | 10/2001 |

* cited by examiner

*Primary Examiner* — Carlos Amaya
(74) *Attorney, Agent, or Firm* — Laurence A. Greenberg; Werner H. Stemer; Ralph E. Locher

(57) ABSTRACT

An energy supply is provided along a route with at least one distribution station, wherein a first voltage is applied at the input and a second voltage at the output. The second voltage is lower or higher than the first voltage. A plurality of components are arranged along the route. A component, which is supplied with the second voltage, includes a power supply unit for transforming the second voltage into a third voltage.

16 Claims, 2 Drawing Sheets

ENERGY SUPPLY IN WHICH A PLURALITY OF COMPONENTS DISPOSED ALONG A TRANSMISSION ROUTE EACH TRANSFORM A VOLTAGE

BACKGROUND OF THE INVENTION

Field of the Invention

The invention relates to an energy supply.

Component, in particular various consumers, are arranged along linear transmission routes. Examples of such transmission routes are a roadway, a stretch of Transrapid railway, a pipeline, a street, a railway line or a telecommunications line.

Such a component often requires electrical components, for example for amplifying signals, for monitoring installation states or for the decentralized control of an installation.

In this case, the components are often arranged at similar physical distances from one another, for example all at 5 km.

The components have, for example, a relatively moderate energy consumption (approximately <1 kW) since often electronic circuits and less often drives are supplied with electrical energy.

Also, no other infrastructure for energy supply is often provided along the transmission route which could be used to supply energy to the components.

Owing to the length of the transmission route, for example 10 km to 100 km, an electrical supply by means of a 230 V system voltage is unfavorable since the voltage drop across the supply lines would be too high or the necessary cable cross section for the cables would result in unproportionately high cable costs.

For this reason, the supply generally takes place via a medium voltage.

FIG. 1 shows an arrangement for the energy supply of a transmission route 101 along which a plurality of components 102 to 107 are arranged. In the example of FIG. 1, in each case two components are supplied with a 230 V system voltage, which is provided by a distribution substation 108, 109 and 110. A medium voltage of the order of 15 kV supplies the distribution substations 108 to 110.

Each component comprises substantially the devices which are connected as loads to the 230 V system voltage.

This approach has in particular the following disadvantages:
a. The distribution substations 108 to 110 are expensive. They need to be installed and operated (for example monitored) and, in addition to a transformer, also contain the respectively required medium voltage technology.
b. In addition to the medium-voltage cables parallel to the transmission route, spurs to the components (230 V system lines) are also required. This results in considerable cable costs, specifically in the case of long transmission routes.
c. Specially trained personnel are required for the operation of the medium voltage technology. Furthermore, a large amount of physical space is required owing to the comparatively high voltage.
d. The individual consumers in the component utilize the existing cables inefficiently.

BRIEF SUMMARY OF THE INVENTION

The object of the invention consists in avoiding the above-mentioned disadvantages and in particular in providing a solution for energy supplied to the components which is favorable in terms of the installation.

This object is achieved in accordance with the features of the independent patent claims. Developments of the invention are also given in the dependent claims.

In order to achieve the object the invention proposes energy supply along a transmission route comprising:
- at least one distribution substation, whose input has a first voltage applied to it and which provides a second voltage at its output, the second voltage being lower or higher than the first voltage;
- a plurality of components, which are arranged along the transmission route, the component being supplied by the second voltage and having a switched mode power supply, by means of which the second voltage can be transformed to a third voltage.

In this case it is advantageous that only the second voltage, which is lower than the first voltage, is used for supplying the components. The first, high voltage is transformed only in the at least one distribution substation.

One development is that the first voltage is a medium voltage. In particular, the first voltage can be a voltage in the range of from 5 kV to 20 kV.

Another development is that the second voltage is a low voltage. In particular, the second voltage can be a voltage of less than (or equal to) 1000 V.

A further development is that the second voltage is an AC voltage. Alternatively, the second voltage could also be a DC voltage. It is furthermore possible for the second voltage to be in the form of a three-phase system.

One configuration consists in that the second voltage is transformed by means of the switched mode power supply to a regulated third voltage, the third voltage being an AC voltage or a DC voltage in which case, in particular, the third voltage can comprise a voltage of the order of 12 V, 24 V, 48 V, 110 V, 230V.

A further configuration is that the component comprises a consumer or terminals for a consumer, the consumer being arranged along the transmission route. In this case, the consumer can comprise a regulation unit for the transmission route.

A next development is that the component comprises the following units:
- an input transformer;
- a unit for power factor correction, which is connected to the input transformer;
- a voltage regulator, which is connected to the unit for power factor correction;
- an inverter, which is connected to the voltage regulator, the inverter generating the third voltage.

Alternatively, the component can also comprise the following units:
- an input transformer;
- a voltage regulator, which is connected to the input transformer;
- an inverter, which is connected to the voltage regulator, the inverter generating the third voltage.

Furthermore, the component can comprise an intermediate circuit capacitor, which is arranged upstream of the inverter.

Also, the component can comprise a DC-to-DC converter if the second voltage is a DC voltage.

A further development is that the (linear) transmission route comprises:
- a roadway;
- a stretch of Transrapid railway;
- a pipeline;
- a street;
- a railway line;
- a telecommunications line.

BRIEF DESCRIPTION OF SEVERAL VIEWS OF THE DRAWING

Exemplary embodiments of the invention will be illustrated and explained below with reference to the drawing, in which.

DESCRIPTION OF THE INVENTION

Figure 1:
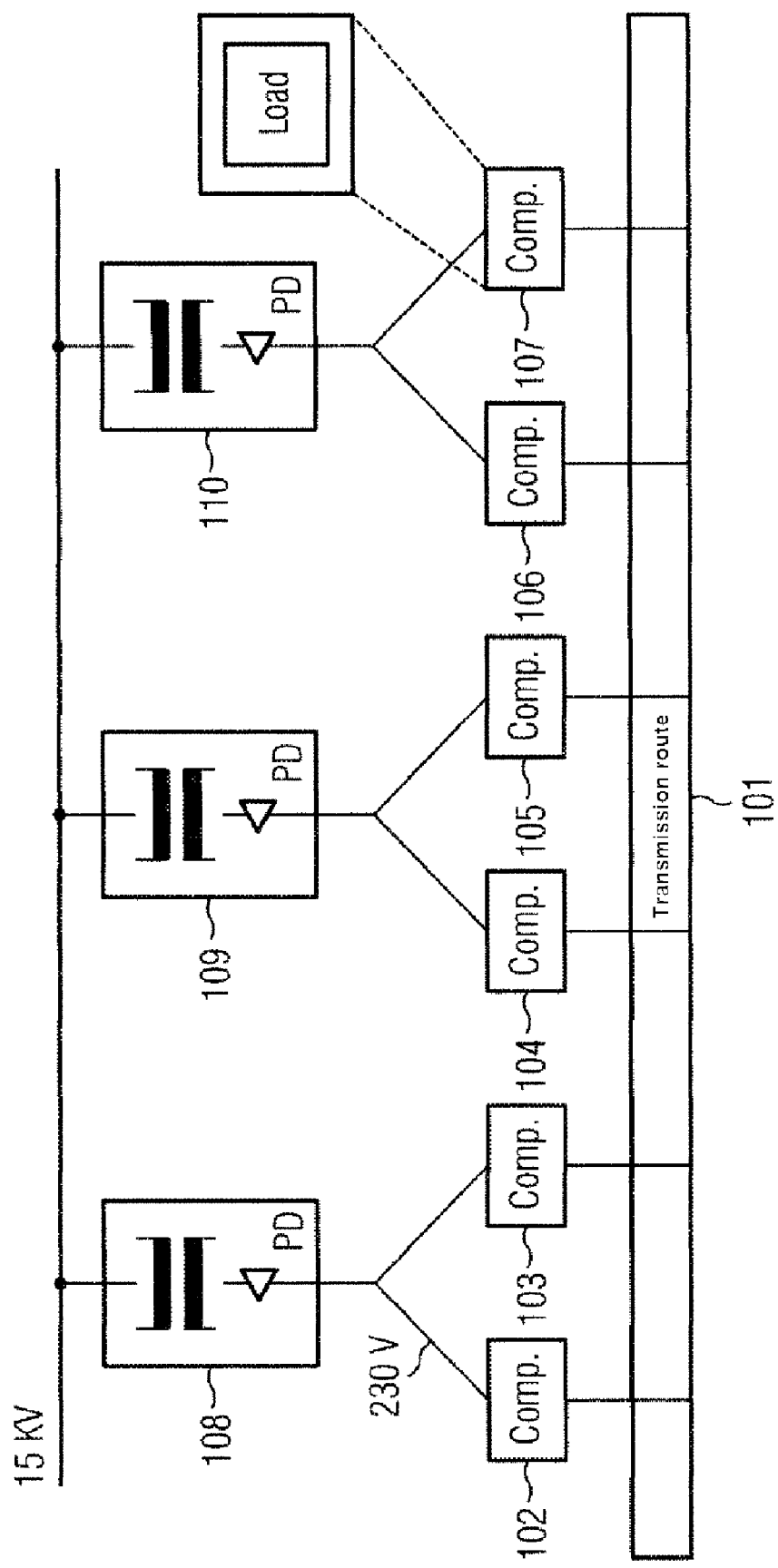
FIG. 1 shows a prior art energy supply along a transmission route.
Figure 2:
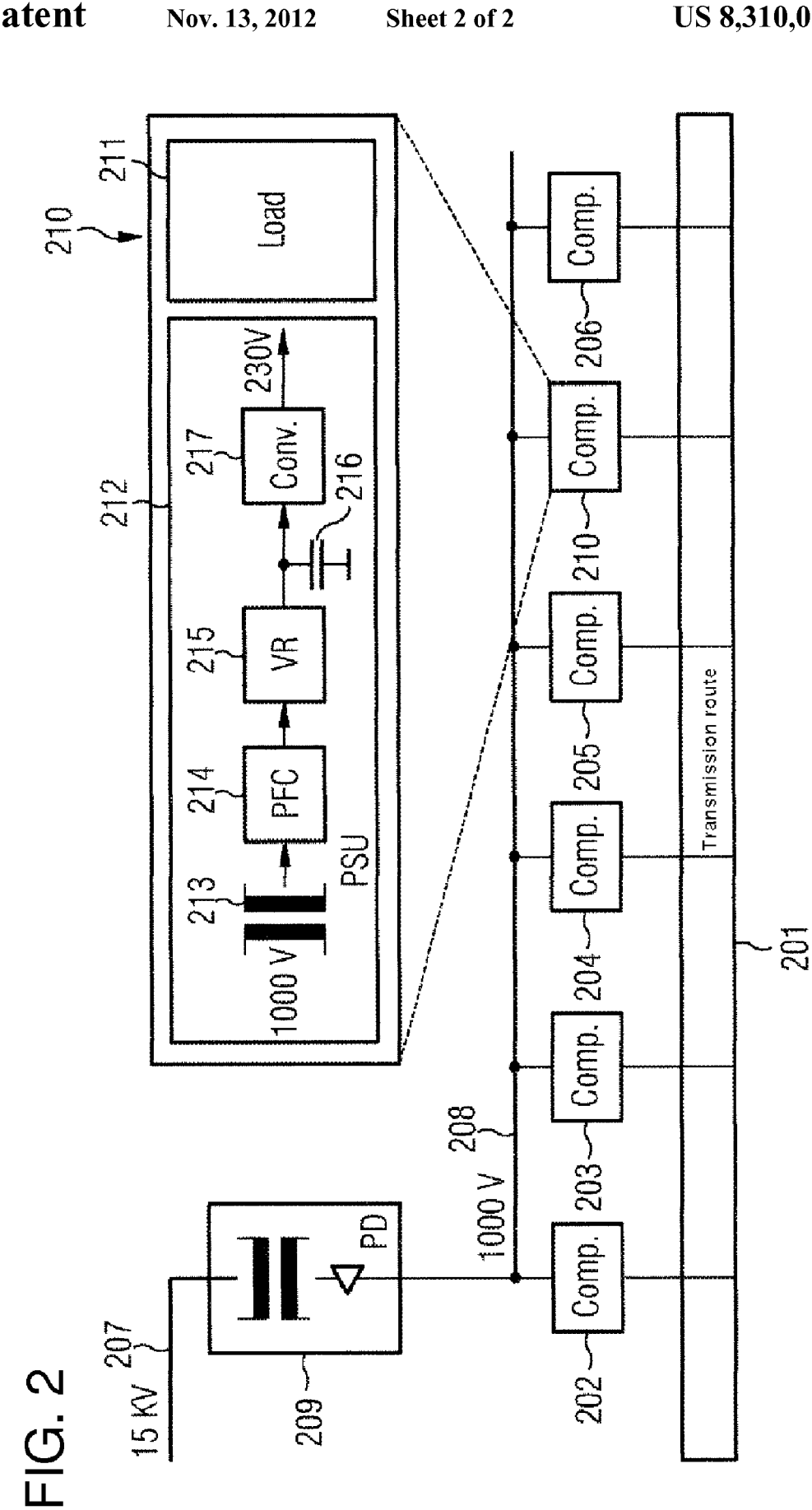
FIG. 2 shows an energy supply along a transmission route, in particular of a plurality of components, which are arranged along the transmission route, and a possible design of a component.

FIG. 2 shows an energy supply along a transmission route 201, in particular of a plurality of components 202 to 206 and 210, which are arranged along the transmission route 201.

An energy feed is provided at the start of the transmission route 201 via the medium voltage 207 of the order of 15 kV, for example.

Alternatively, a feed at the end or the center or redundant feed at a plurality of points on the transmission route 201 is also possible.

The medium voltage 207 is transformed via a distribution substation 209 to a low voltage 208.

The supply to the components 202 to 206 and 210 takes place via the low voltage 208, which is preferably lower than 1000 V. Advantageously, a voltage of just below 1000 V is used in order to enable in particular a small cable cross section. The low voltage 208 is preferably in the form of an AC system. Alternatively, the low voltage 208 can be in the form of a three-phase system.

One advantage of this arrangement consists in the fact that the distribution substation 209 and therefore the medium-voltage infrastructure is only required once (per distribution substation).

The figure shows an exemplary design of the component 210. In the component 210, a switched mode power supply 212 is provided in addition to the load 211. As an alternative to this, the load can also be arranged outside the component.

An input transformer 213 reduces the voltage for the downstream components and produces DC isolation. Owing to the position directly at the input of the component, additional lightning protection measures can advantageously be provided. A voltage which is less than an intermediate circuit voltage in particular also at a maximum input voltage (for example at 1000 V) is applied to the output of the input transformer.

The input transformer 213 is connected to a unit for power factor correction 214, which ensures a sinusoidal profile of the current in the cable and therefore efficient utilization of the cable. In particular, the unit for power factor correction 214 is optional; from time to time, for example at low loads, it can be dispensed with.

In particular owing to length of the cable 208 for supplying the components 202 to 206 and 210, considerable voltage drops result across the cable in the case of a cable cross section which is minimal in the context of a cost-efficient design, i.e. the input voltage of a component can decrease to 50% of the output voltage of the distribution substation 209 (i.e. to less than 500 V). Such voltage drops and other fluctuations in the input voltage are compensated for by the switched mode power supply 212.

A voltage regulator 215 is connected to the output of the unit for power factor correction 214 and generates a constant intermediate circuit voltage at an intermediate circuit capacitor 216 (possibly an alternative energy store, for example a current intermediate circuit, can also be used).

In particular, the voltage regulator 215 measures the voltage of the intermediate circuit and drives the power factor correction 214 in such a way that a (virtually) constant voltage results in the intermediate circuit.

The unit for power factor correction 214 and the voltage regulator 215 can also be in the form of a dedicated (separate) circuit block. Said unit and voltage regulator ensure that a constant intermediate circuit voltage is available irrespective of the input voltage. In the case of a variable intermediate circuit voltage, a downstream inverter 217 preferably compensates for these voltage fluctuations.

The inverter 217 generates a constant output voltage, for example a customary system voltage of the order of 230 V, at its output from the intermediate circuit voltage. If required, it is also possible for a DC voltage with a fixed level, for example 24V, or a variable level to be provided.

By varying the size of the intermediate circuit capacitor 216 in combination with additional current limitation and regulation in the inverter 217, it is possible to achieve the situation in which pulsed current consumptions are drawn from the intermediate circuit capacitor 216 and are not visible on the 1000 V cable 208 (buffer effect of the intermediate circuit capacitor 216). Such pulsed current consumptions typically occur during switching (connection) of consumers. By virtue of this buffer function, the cable 208 can have an efficient design since each consumer only draws its average power from the power supply cable (1000 V) and current peaks, for example during said connection of a consumer, are buffer-stored by virtue of the intermediate circuit capacitor.

In particular for the case in which the low voltage 208 is a DC voltage, the input transformer 213 and the power factor correction 214 can be replaced by a DC-DC converter.

Further advantages:
a. It is not necessary for a high medium voltage to be conducted along the transmission route. The medium voltage is preferably provided once per distribution substation. Otherwise, the entire installation is constructed using low voltage technology
  (preferably less than 1000 V). As a result, the costs for installation and operation can be markedly reduced. Furthermore, the connection of the component to the 1000 V cable is simplified (cable joints).
b. Only a single cable is required parallel to the transmission route. Additionally cabling with a star topology starting from the distribution substation can be dispensed with. This results in a considerable reduction in costs as regards cables and the laying of the cables.
c. A power factor correction can be provided efficiently. Costs associated with cables and transformers are thus reduced.
d. Using the electronics provided in the component, pulse loads can be efficiently blocked off, which has a positive effect on the costs associated with cables and transformers.

The invention claimed is:

1. An energy supply along a transmission route, comprising:
  at least one distribution substation having an input receiving a first voltage and an output carrying a second voltage, wherein the second voltage is lower or higher that the first voltage;
  a plurality of components disposed along the transmission route, each said component being supplied with the second voltage and having a power supply configured to transform the second voltage to a third voltage, and said component comprising:
  an input transformer;
  a unit for power factor correction connected to said input transformer;
  a voltage regulator connected to said unit for power factor correction; and
  an inverter for generating the third voltage, said inverter being connected to said voltage regulator.

2. The energy supply according to claim 1, wherein the first voltage is a medium voltage.

3. The energy supply according to claim 1, wherein the first voltage is a voltage in a range of from 5 kV to 20 kV.

4. The energy supply according to claim 1, wherein the second voltage is a low voltage.

5. The energy supply according to claim 1, wherein the second voltage is a voltage less than or equal to 1000 V.

6. The energy supply according to claim 1, wherein the second voltage is an AC voltage.

7. The energy supply according to claim 1, wherein the second voltage is a three-phase system voltage.

8. The energy supply according to claim 1, wherein the second voltage is a DC voltage.

9. The energy supply according to claim 1, wherein said power supply is configured to transform the second voltage to a regulated third voltage, the third voltage being an AC voltage or a DC voltage.

10. The energy supply according to claim 1, wherein the third voltage is a voltage selected from the group consisting of 12 V, 24 V, 48 V, 110 V, and 230 V.

11. The energy supply according to claim 1, wherein said component comprises a consumer or terminals for a consumer, and wherein the consumer is arranged along the transmission route.

12. The energy supply according to claim 11, wherein the consumer includes a unit for power factor correction that has an output, and a voltage regulator that is connected to said output of said unit for power factor correction.

13. The energy supply according to claim 1, wherein said power supply is a switched mode power supply.

14. The energy supply according to claim 1, which comprises an intermediate-circuit capacitor connected upstream of said inverter.

15. The energy supply according to claim 1, wherein the second voltage is a DC voltage and said component comprises a DC-to-DC converter.

16. The energy supply according to claim 1, wherein the transmission route comprises:
a roadway;
a stretch of high-speed railway;
a pipeline;
a street;
a railway line;
a telecommunications line.

* * * * *